United States Patent [19]

Whipple et al.

[11] Patent Number: 4,465,617

[45] Date of Patent: Aug. 14, 1984

[54] METHOD FOR PREPARING A MOLDING COMPOSITION

[75] Inventors: Bruce A. Whipple, Mooresville; Victor S. Dunn, Indianapolis, both of Ind.

[73] Assignee: RCA Corporation, New York, N.Y.

[21] Appl. No.: 541,495

[22] Filed: Oct. 12, 1983

Related U.S. Application Data

[63] Continuation of Ser. No. 231,287, Feb. 4, 1981, abandoned.

[51] Int. Cl.$^3$ .............................................. H01B 1/06
[52] U.S. Cl. .................................... 252/511; 264/105; 358/342; 358/343; 358/344; 524/495
[58] Field of Search ............... 523/124, 181; 358/342, 358/129, 127; 179/100.4 R; 524/495, 496; 274/41 A, 1 R, 41 A; 365/102; 346/151, 77 E; 265/105, 106

[56] References Cited

U.S. PATENT DOCUMENTS

| | | | |
|---|---|---|---|
| 3,842,194 | 10/1974 | Clemens | 179/100 |
| 4,228,050 | 10/1980 | Martin et al. | 274/41 A |
| 4,396,660 | 8/1983 | Hater et al. | 252/511 |

FOREIGN PATENT DOCUMENTS 137631  2/1947  Austria .

Primary Examiner—Josephine Barr
Attorney, Agent, or Firm—Birgit E. Morris; R. Hain Swope

[57] ABSTRACT

A method for obtaining a conductive molding composition for a capacitive information disc record having uniform and predetermined performance properties wherein the conductive molding composition comprises carbon black and a molding resin. The method comprises determining the melt viscosity of a conductive molding composition for a capacitive information disc record which has the desired performance properties, and preparing said conductive molding composition so that it has said melt viscosity.

8 Claims, No Drawings

METHOD FOR PREPARING A MOLDING COMPOSITION

This is a continuation of application Ser. No. 231,287, filed Feb. 4, 1981, abandoned.

This invention relates to a method for preparing a conductive molding composition which contains carbon black for use in a capacitive information disc record.

BACKGROUND OF THE INVENTION

Clemens in U.S. Pat. Nos. 3,842,194, 3,842,217 and 3,909,517 has described a capacitive information disc record comprising a molded plastic disc record having audio and video information in the form of geometric variations in a spiral groove in the disc record surface. These disc records are conformally overcoated with a conductive material, which acts as a first electrode, and then further overcoated with a dielectric layer. A metal-tipped stylus acts as the second electrode of a capacitor and the information signals recovered as variations in capacitance between the stylus electrode and the disc record conductive layer are processed to reconstitute the audio and video information. Relative motion is established between the disc record and the stylus during information recovery.

Capacitive information disc records have also been developed which do not require a grooved surface. With this type of disc record the stylus is maintained in synchronization with an information pattern in the disc record surface by means of electrical signals recorded on either side of the information track rather than physically by means of the groove walls.

Fox et al., in a copending application entitled "A Conductive Video Disc," Ser. No. 105,550, filed Dec. 20, 1979, disclose a capacitive information disc record which is made of a conductive molding composition containing a molding resin such as poly(vinyl chloride) and a sufficient amount of conductive particles such as carbon black so that the disc record can provide capacitance readout without a conductive coating. The conductive molding composition may also contain additives such as flow modifiers, lubricants, stabilizers and the like. This development has eliminated the need for separate coatings of metal and dielectric layers on the disc record and may be used for either grooved or non-grooved capacitive information disc records.

Carbon blacks suitable for use in a capacitive information disc record conductive molding composition include highly electrically-conductive, finely-divided carbon blacks preferably having a low bulk density to reduce loading requirements. These carbon blacks should have a high surface area and a high proportion of voids within the particles which enables current to flow between the conductive particles.

The amount of carbon black present in the conductive molding composition depends on the electrical properties required. For example, the amount of carbon black is generally directly related to the conductivity of the resultant information disc record. However, large quantities of fillers such as carbon black decrease the processability of a molding composition and increases the brittleness of the product. Fox et al. in the aforementioned copending application have found that Ketjenblack EC carbon black (a product of Akzo Chemie) present in amounts from about 10 to about 20 percent by weight achieves the desired molding composition conductivity and processability.

It has been found that batch-to-batch variations occur in the properties of the carbon black which affects the ability to reliably mass produce the capacitive information disc records. These variations affect the performance properties of the capacitive information disc record. Performance properties are those properties which relate to the quality of the information signal which is recorded in the capacitive information disc record and include the video carrier signal-to-noise ratio (VCN) and audio carrier signal-to-noise ratio (ACN). Even when the same carbon black product is employed at the same weight percent loading in the same molding composition formulation, batch-to-batch variations in the performance properties of the capacitive information disc records occur.

Furthermore, when an optimum composition for obtaining certain performance properties has been found, which contains a determined amount of carbon black from a given batch, attempts to prepare additional amounts of the optimum composition from the same carbon black batch by mixing compositions having higher and lower amounts of carbon black to obtain the same average amount of carbon black were unsuccessful. The mixing of compositions did not result in capacitive information disc records having the same performance properties as those prepared from the original optimal composition.

Therefore, it is desirable to develop a method for preparing conductive molding compositions in order to produce capacitive information disc records having uniform and predeterminable performance properties.

SUMMARY OF THE INVENTION

We have found a method for obtaining a conductive molding composition for a capacitive information disc record which has uniform and predetermined performance properties wherein the conductive molding composition comprises carbon black and a molding resin. The method comprises determining the melt viscosity of a conductive molding composition of a capacitive information disc record which has the desired performance properties, and preparing said conductive molding composition so that it has said melt viscosity.

DETAILED DESCRIPTION OF THE INVENTION

We have found that the melt viscosity of a conductive molding composition containing carbon black and a molding resin, such as a homopolymer or copolymer of vinyl chloride, is related to the performance of the resulting capacitive information disc record. The apparent melt viscosity ($\eta$) varies directly with the shear stress ($\tau$) and inversely with the shear rate ($\dot{\gamma}$) and may be expressed by the following formula:

$$\eta = \tau/\dot{\gamma} \qquad \text{(Equation 1)}$$

Attempts to blend compositions according to their melt viscosities did not produce a conductive molding composition having a melt viscosity equal to the average melt viscosity of the individual molding compositions. Also, the performance properties were not linearly related to the melt viscosity. However, we have found that log $\eta$ can be related to the performance properties of the capacitive information disc records and can be used in mixing individual molding compositions to obtain a molding composition having the desired melt viscosity.

Various relationships may be employed to aid in the preparation of conductive molding compositions. For example, $$\log \eta = A + B \times W \quad \text{(Equation 2)}$$

wherein W is the percent by weight of carbon black in the molding composition and A and B are empirically determined constants. The sum of the parts by weight of carbon black and the molding resin are kept constant as is the parts by weight of additives. The percent by weight of carbon black (W) is varied by changing the relative amounts of the molding resin and the carbon black. The melt viscosity for a conductive molding composition having a given carbon black content is obtained and log $\eta$ vs. W may be plotted to obtain a linear relationship which allows the intercept (A) and the slope (B) to be determined. After A and B have been determined, Equation 2 can be used to obtain a conductive molding composition having a desired log $\eta$. By solving the equation for W the weight percent of carbon black needed to prepare a conductive molding composition having the desired log $\eta$ can be determined. The shear stress ($\tau$) may be substituted for $\eta$ in Equation 2 if a constant shear rate ($\gamma$) is employed for all measurements of $\tau$. A and B may be different if $\tau$ rather than $\eta$ is employed but they are determined in the same manner.

It is sometimes desirable to obtain a conductive molding composition having a given melt viscosity from two or more compositions wherein at least one composition has a melt viscosity higher than desired and at least one is lower. Such variations in melt viscosity may occur because of batch-to-batch variations in the carbon black. Thus, if it has been previously established that a certain weight percent of carbon black should be used in formulating individual conductive molding compositions, different carbon black batches may result in the resulting compositions having different melt viscosities. Thus, in order to use these individual compositions they should be blended together in the appropriate proportions to obtain a resulting composition having the desired melt viscosity.

A simple mixing of two individual compositions, one having a higher than desired melt viscosity and one having a lower than desired melt viscosity, does not lead to a resultant composition having a melt viscosity which is linearly dependent on the amount of each composition. Thus, the formula:

$$\eta_r = \sum_n^{i=1} (F_i \times \eta_i) \quad \text{(Equation 3)}$$

wherein $F_i$ is the weight fraction of an individual composition i present in the resultant composition r and the sum of $F_i$ is 1, $\eta_i$ is the melt viscosity of an individual composition i, and $\eta_r$ is the melt viscosity of the resultant composition after blending the individual compositions, has been found *not* to be effective.

However, we have found that Equation 4 can be used to blend n individual conductive molding compositions i to obtain a resultant composition r having the desired $\eta_r$ where at least one individual composition has a higher $\eta_i$ than the desired $\eta_r$ and at least one individual composition has an $\eta_i$ lower than $\eta_r$:

$$\log \eta_r = \sum_n^{i=1} (F_i \times \log \eta_i) \quad \text{(Equation 4)}$$

It is desirable to have a relationship between a processing parameter such as melt viscosity and performance properties. This relationship could then be used, for example, to allow for the production of capacitive information disc records having known performance properties merely by adjusting the processing parameter.

The performance properties can be empirically related back to the melt viscosity by determining the melt viscosity of the conductive molding composition of a capacitive information disc record having the desired performance properties. The composition of other conductive molding compositions can be formulated so that the determined melt viscosity is obtained (e.g., by use of Equation 2 or 4).

An alternate approach is to determine the relationship between melt viscosity and a performance property. This relationship can then be used to predict the performance properties of a capacitive information disc record produced from a conductive molding composition having a particular melt viscosity. A suitable equation is $$y = a + bx + cx^2 + dx^3 \quad \text{(Equation 5)}$$

wherein x is the log $\eta$, y is the log of a performance property (e.g., log VCN or log ACN) and a, b, c, and d are empirically determined constants. Again $\tau$ may be substituted for $\eta$ if all measurements are performed at a constant $\dot{\gamma}$. The empirically determined constants may be different for the substitution.

We have found that Equation 5 holds for a given type of carbon black from one source. Thus, for example, Ketjenblack EC and Cabot CSX-150 (available from Cabot Corporation) have different empirically determined constants a–d, but both materials obey this equation. The constants a–d are determined by fitting Equation 5 to a plot of log $\eta$ vs log VCN, for example, by means of a regression analysis. After a–d are determined, Equation 5 can be used to determine the log $\eta$ of a composition which must be obtained so that the capacitive information disc record will have the desired performance property.

A property which measures the quality of the picture obtained is VCN obtained during playback of a recorded carrier signal. VCN should be as high as possible and at least 40 decibels (dB) for a commercially acceptable analog video signal. This ratio generally increases as the resistivity of the capacitive information disc record decreases.

The higher the carbon black loading, the higher the temperature which must be employed to compound and mold the conductive molding composition. The upper temperature limit occurs when there is significant decomposition of the molding resin. The decomposition temperature thus serves to determine the maximum carbon black loading which can be accommodated. In general, the shear stress at 200° C. for a conductive molding composition comprising carbon black and a vinyl chloride homopolymer molding resin at a shear rate of 0.625 sec$^{-1}$ should preferably be between about 10 and 17 pounds per square inch (psi) more preferably between 11 and 14 psi. This preferred shear stress results in the preferred combination of performance properties for a consumer capacitive electronic disc capacitive information disc record.

The invention will be further illustrated by means of the following examples but it is to be understood that the invention is not meant to be limited to the details disclosed therein. In the examples, parts and percentages are by weight.

EXAMPLE 1

Three 9 kilogram bags of Ketjenblack EC carbon black from the same lot were formulated into conductive molding compositions as follows:

90.0-X parts Geon 110×346 (a homopolymer of vinyl chloride available from B. F. Goodrich Co. having a weight averaged molecular weight of 46,200, a number average molecular weight of 23,300 and a $T_g$ of 80° C.), X parts Ketjenblack EC carbon black, and 10.0 parts additives X=Carbon black weight percent.

The amount of vinyl chloride homopolymer was varied so that the sum of the parts of carbon black and parts of homopolymer was constant. The shear stress ($\tau$ (actual)) at 200° C. for formulations from each of the carbon black bags was measured at a shear rate ($\dot{\gamma}$) of 0.625 sec$^{-1}$. The results are shown in Table I.

TABLE I

| Bag No. | % Carbon Black | $\tau$ (actual) (psi) | $\tau$ (calc.) (psi) |
|---|---|---|---|
| 1 | 15 | 10.8 | 11.8 |
| 1 | 14 | 9.9 | 8.97 |
| 1 | 13 | 6.5 | 6.82 |
| 3 | 15 | 11.4 | 11.81 |
| 5 | 15 | 12.8 | 11.81 |

The following relationship employing Equation 2 was found by regression analysis of a plot of log $\tau$ vs. % carbon black (W):

$$\log \tau = -0.7186 + 0.1194 \times W \quad \text{(Equation 6)}$$

wherein A=−0.7186 and B=0.1194.

The square of the regression coefficient, r$^2$, for Equation 6 is 0.8975, which indicates a good fit. The calculated values of $\tau$ ($\tau$(calc.)) using Equation 6 are shown in Table I. A better fit would result if the bag-to-bag variations were taken into account. The % deviation is obtained by the formula:

$$\% \text{ deviation} = \frac{\tau(\text{calc.}) - \tau(\text{actual})}{\tau(\text{actual})} \quad \text{(Equation 7)}$$

The average % deviation of $\tau$ (calc.) from $\tau$ (actual) is only 0.28 psi.

EXAMPLE 2

Equation 6 of Example 1 was employed to determine the % carbon black needed to obtain a desired shear stress in the formulation employed in Example 1. Equation 6 was solved for W using a shear stress of 9 psi. In order to obtain a conductive molding composition having the desired shear stress a % carbon black (W) of 14.01 in the conductive molding composition would be required.

EXAMPLE 3

The formulations shown in Table II were employed for these experiments.

TABLE II

| Ingredients | Percent |
|---|---|
| 1. B. F. Goodrich Geon 110 × 346 | (91.0 − X) |
| 2. Ketjenblack EC carbon black | X |
| 3. Additives | 9.0 |

X = Carbon black weight percent from 8.5 to 19 in 1.5 percent increments.

The molding composition was prepared by mixing the ingredients in a Henschel mixer. Mixing was discontinued when the temperature reached about 160° F. (71° C.) and the composition was collected and charged to a Banbury mixer to melt the ingredients under shear. The composition was mixed until molten, about 320° F. (160° C.), sheeted on a two roll mill and pelletized.

Molded 12 inch (30.5 centimeter) capacitive information disc records were made by forming a preform, compression molding the preform using a forty second cycle at about 360°–400° F. (182°–204° C.) and removing the flashing.

The capacitive information disc records were measured for the VCN parameter using the method of Kawamoto, U.S. Pat. No. 4,080,625. The results are shown in Tables III–V using the formulations shown in Table II. Different lots of carbon black were employed for the three series and are designated 1–4. The VCN for a 5 megahertz carrier signal was tested on the outside portion (at a radius of 5.3 inches) and on the inside portion (at a radius of 3.3 inches) of each disc record.

TABLE III

SERIES I

| % Carbon Black | Carbon Black Lot | Shear Stress (lbs./in$^2$) at 200° C. when Shear Rate = 0.625 sec$^{-1}$ | VCN (dB) (outside) | VCN (dB) (inside) |
|---|---|---|---|---|
| 13.0 | 1 | 3.4 | 42.0 | 41.3 |
| 14.5 | 1 | 4.8 | 42.7 | 41.3 |
| 16.0 | 1 | 7.0 | 46.7 | 46.0 |
| 17.5 | 1 | 12.4 | 48.7 | 46.7 |
| 19.0 | 1 | 16.0 | 49.0 | 45.7 |

TABLE IV

SERIES II

| % Carbon Black | Carbon Black Lot | Shear Stress (lbs./in$^2$) at 200° C. when Shear Rate = 0.625 sec$^{-1}$ | VCN (dB) (outside) | VCN (dB) (inside) |
|---|---|---|---|---|
| 8.5 | 2 | 1.5 | 40.3 | 38.7 |
| 10.0 | 2 | 1.8 | 41.0 | 39.7 |
| 11.5 | 2 | 3.3 | 44.0 | 42.7 |
| 13.0 | 2 | 6.8 | 50.0 | 47.0 |
| 14.5 | 2 | 10.7 | 52.0 | 49.0 |
| 17.5 | 3 | 25.3 | 53.0 | 49.3 |
| 19.0 | 3 | 34.9 | 53.0 | 49.7 |

TABLE V

SERIES III

| % Carbon Black | Carbon Black Lot | Shear Stress (lbs./in$^2$) at 200° C. when Shear Rate = 0.625 sec$^{-1}$ | VCN (dB) (outside) | VCN (dB) (inside) |
|---|---|---|---|---|
| 10.0 | 4 | 3.1 | 44.0 | 43.0 |
| 11.5 | 4 | 4.8 | 43.7 | 42.0 |
| 13.0 | 4 | 7.8 | 47.3 | 45.3 |
| 14.5 | 4 | 12.7 | 48.3 | 45.3 |
| 16.0 | 4 | 18.7 | 50.7 | 47.0 |
| 17.5 | 4 | 31.8 | — | 46.7 |

TABLE V-continued

SERIES III

| % Carbon Black | Carbon Black Lot | Shear Stress (lbs./in$^2$) at 200° C. when Shear Rate = 0.625 sec$^{-1}$ | VCN (dB) (outside) | VCN (dB) (inside) |
| --- | --- | --- | --- | --- |
| 19.0 | 4 | 54.5 | 52.7 | 47.7 |

The data in Tables III–V was subjected to non-linear regression analysis using the equation:

$$y = a + bx + cx^2 + dx^3 \quad \text{(Equation 5)}$$

where y is log VCN, x is log $\tau$ at a constant $\dot{\gamma}$ and a, b, c and d are empirically determined constants. Log (VCN (outside)) and log (VCN (inside)) were each plotted vs. log $\tau$ for each conductive molding composition having a different carbon black loading in each series. Regression analysis was employed to fit Equation 5 to the plotted data and constants a–d were obtained which corresponded to the best fit.

For VCN, carbon black loading was not a useful predictor of VCN playback performance of the capacitive information disc records, but Equation 5, where y = log VCN and x = log $\tau$, with the empirical constants determined by regression analysis was useful.

The results of the regression analyses of the data using Equation 5 are shown in Table VI. The square of the regression coefficient, r$^2$, and S, the standard deviation for each sample, both measure the goodness of fit of the calculated values to the data.

TABLE VI

| Coefficient | Outside | Inside |
| --- | --- | --- |
| a | 1.5988 | 1.5665 |
| b | 4.1582 × 10$^{-2}$ | 1.4498 × 10$^{-1}$ |
| c | 5.4421 × 10$^{-2}$ | −8.7175 × 10$^{-2}$ |
| d | −1.7502 × 10$^{-2}$ | 3.1472 × 10$^{-2}$ |
| r$^2$ | 0.953 | 0.908 |
| S(dB) | 0.96 | 1.28 |

The goodness of fit between calculated and observed values is good. A melt viscosity or shear stress value must be chosen to reach an acceptable VCN on the inside and outside portions of the capacitive information disc record, that is, greater than 40 dB. Tradeoffs of optimum VCN values may have to be made in light of the requirements of other performance parameters.

EXAMPLE 4

Conductive molding compositions were formulated in accordance with Example 3. One lot of Ketjenblack EC was employed to prepare conductive molding composition CA and a second lot was used to prepare conductive molding composition CB. CA and CB each contained the same weight percent of carbon black. Mixtures of these two compositions were prepared by mixing the appropriate weight percent of each composition and compounding the mixture with a Brabender Plasticorder at 350° F. (177° C.) at 50 revolutions per minute for eight minutes. The shear stress of each of the mixtures was then determined at 200° C. at a shear rate of 0.625 sec$^{-1}$. The results are shown in Table VII below.

TABLE VII

| Sample Composition by Weight | Average Shear Stress (psi) |
| --- | --- |
| 100% CA | 9.2 |
| 75% CA, 25% CB | 10.2 |
| 50% CA, 50% CB | 12.3 |
| 25% CA, 75% CB | 14.1 |
| 100% CB | 17.1 |

It is apparent that there is no linear relationship between shear stress at constant shear rate, which is directly related to $\eta$, and the arithmetic average of the shear stress of CA and CB. Thus, for the 50%CA, 50%CB sample composition, the shear stress is not the average of that of 100%CA and 100%CB. However, there is a linear relationship between log $\eta$ or log $\tau$ at constant $\dot{\gamma}$ which corresponds to Equation 3.

EXAMPLE 5

The procedure of Example 3 was repeated using one lot of Cabot Corporation CSX-150 carbon black. This carbon black has spherically-shaped particles while Ketjenblack EC carbon black particles resemble broken egg shells. The values of $\tau$ were obtained at 200° C. at $\dot{\gamma} = 0.625$ sec$^{-1}$. The observed and calculated values of VCN using a 5 megahertz video carrier signal are shown in Table VIII.

TABLE VIII

| Weight Percent Carbon | $\tau$(psi) | VCN Outside (dB) | | VCN Inside (dB) | |
| --- | --- | --- | --- | --- | --- |
| | | Observed | Calculated | Observed | Calculated |
| 10.0 | 2.3 | 36.3 | 35.9 | 34.7 | 34.2 |
| 11.5 | 3.4 | 40.0 | 41.5 | 38.3 | 40.2 |
| 13.0 | 4.8 | 47.0 | 45.6 | 46.3 | 44.3 |
| 14.5 | 6.3 | 48.3 | 48.0 | 46.7 | 46.5 |
| 16.0 | 10.1 | 49.7 | 50.3 | 47.7 | 48.4 |
| 17.5 | 12.8 | 50.0 | 50.4 | 48.0 | 48.4 |
| 19.0 | 16.7 | 50.0 | 49.6 | 48.3 | 47.9 |

Equation 5 was utilized to obtain the calculated values of VCN where y is log VCN and x is log $\tau$ at constant $\dot{\gamma}$. The empirically determined constants and the statistical results are shown in Table IX and were obtained as described in Example 3. Using this data a desired VCN can be obtained by preparing a conductive molding composition having the corresponding calculated $\tau$.

TABLE IX

| Coefficient | Outside | Inside |
| --- | --- | --- |
| a | 1.3622 | 1.2887 |
| b | 6.4802 × 10$^{-1}$ | 8.8325 × 10$^{-1}$ |
| c | −3.1951 × 10$^{-2}$ | −6.0844 × 10$^{-1}$ |
| d | 1.0385 × 10$^{-2}$ | 1.2096 × 10$^{-1}$ |
| r$^2$ | 0.973 | 0.953 |
| S(dB) | 1.30 | 1.71 |

COMPARATIVE EXAMPLE

Five 9 kilogram bags of Ketjenblack EC carbon black from the same lot were employed in preparing conductive molding compositions as in Example 1 having 15 parts carbon black.

The shear stress ($\tau$) at 200° C. for formulations from each of the carbon black bags was measured at a shear rate ($\dot{\gamma}$) of 0.625 sec$^{-1}$. The results are shown in Table X.

TABLE X

| Bag No. | Shear Stress ($\tau$) (lbs./in.$^2$) |
| --- | --- |
| 1 | 7.1 |
| 2 | 7.7 |
| 3 | 5.5 |
| 4 | 6.4 |
| 5 | 5.5 |

These results demonstrate the variability of the carbon black even at the same loading from the same lot. Thus, percent carbon black by itself may not be an adequate parameter for formulating conductive molding compositions for video disc records.

We claim:

1. In a method of mass-producing conductive plastic capacitive information records by compression molding a composition comprising conductive carbon black particles, a molding resin comprising a homopolymer or copolymer of vinyl chloride and suitable additives compatible therewith, the improvement wherein the records are produced without batch-to-batch nonuniformity in predetermined performance properties resulting from variation in the physical properties of the carbon black by preparing each batch of said molding composition with a precise weight of carbon black determined by:
   (a) determining the melt viscosity of a conductive molding composition from which records having the desired performance properties have been prepared;
   (b) preparing at least two samples of conductive molding composition from carbon black to be utilized in a given batch, said samples containing varying weight percents of conductive carbon black, the total weight percent of carbon black and resin being constant in all compositions:
   (c) determining the melt viscosity of each of said samples;
   (d) plotting the log of the melt viscosity and the carbon black content of the samples and determining therefrom two empirical constants; and
   (e) determining the precise weight percent of conductive carbon black required to prepare said batch of molding composition according to the formula $$\log n = A + B \times W$$

wherein n is said melt viscosity, A and B are the constants and W is the weight percent of conductive carbon black in said composition.

2. A method in accordance with claim 1, wherein the melt viscosity is determined in step (a) by direct measurement of said conductive molding composition.

3. A method in accordance with claim 1, wherein the melt viscosity is determined in step (a) according to the formula $$y = a + bx + cx^2 + dx^3$$

wherein x equals the log of the melt viscosity, y equals the log of one of said performance properties and a, b, c, and d are empirical constants.

4. A method in accordance with claim 1, wherein the performance property utilized for the determination in step (a) is video carrier signal to noise ratio.

5. In a method of mass-producing conductive plastic capacitive information records by compression molding a composition comprising conductive carbon black particles, a molding resin comprising a homopolymer or copolymer of vinyl chloride and suitable additives compatible therewith, the improvement wherein the records are produced without batch-to-batch nonuniformity in predetermined performance properties resulting from variation in the physical properties of the carbon black by preparing a given batch of said molding composition by:
   (a) determining the melt viscosity of a conductive molding composition from which records having desired performance properties have been prepared;
   (b) providing at least two individual preblended molding compositions, at least one of which has a melt viscosity higher than the desired melt viscosity determined in step (a) and at least one of which has a melt viscosity lower than the desired melt viscosity determined in step (a);
   (c) determining the weight fraction of each of said individual preblended compositions to be combined with the others utilizing the formula $$\log n_r = \sum_{n}^{i=1} (F_i \times \log n_i)$$

wherein $n_r$ is the desired viscosity, i is an individual conductive molding composition, n is the number of individual molding compositions, $n_1$ is the melt viscosity of an individual molding composition and $f_1$ is the weight fraction of an individual molding composition wherein the sum of $F_1$ is 1; and
   (d) mixing said individual conductive molding compositions to form said batch in accordance with said weight fraction determination.

6. A method in accordance with claim 5, wherein the melt viscosity is determined in step (a) by direct measurement of said conductive molding composition.

7. A method in accordance with claim 5, wherein the melt viscosity is determined in step (a) according to the formula $$y = a + bx + cx^2 + dx^3$$

wherein x equals the log of the melt viscosity, y equals the log of one of said performance properties and a, b, c, and d are empirical constants.

8. A method in accordance with claim 5, wherein the performance property utilized for the determination in step (a) is video carrier signal to noise ratio.

* * * * *